United States Patent [19]

Imhoff

[11] Patent Number: 4,725,471
[45] Date of Patent: Feb. 16, 1988

[54] SHEET-LIKE COMPOSITE ELEMENT FOR CONSTRUCTION PURPOSES

[75] Inventor: Adolf Imhoff, Iserlohn, Fed. Rep. of Germany

[73] Assignee: Carry-Space Leichtbauelemente GmbH, Düsseldorf

[21] Appl. No.: 808,829

[22] Filed: Dec. 13, 1985

[30] Foreign Application Priority Data

Dec. 15, 1984 [DE] Fed. Rep. of Germany ....... 3445895

[51] Int. Cl.[4] .......................... B32B 1/04; B32B 3/02; B32B 3/26; E04C 1/00
[52] U.S. Cl. ...................................... 428/71; 52/309.2; 52/309.7; 52/309.11; 52/802; 428/76; 428/83; 428/192; 428/318.4; 428/319.1
[58] Field of Search ........................ 428/68, 71, 76, 83, 428/192, 194, 318.4, 319.1, 316.6, 81; 52/802, 803, 804, 805, 309.2, 309.7, 309.11, 309.16

[56] References Cited

U.S. PATENT DOCUMENTS 3,459,628  8/1969  Dixon et al. .................... 428/319.1

FOREIGN PATENT DOCUMENTS 229750   8/1960  Australia ............................... 428/71
2334477  1/1974  Fed. Rep. of Germany ... 428/319.1
917692   2/1963  United Kingdom ................ 428/81
975265  11/1964  United Kingdom ............. 428/319.1

*Primary Examiner*—William J. Van Balen
*Attorney, Agent, or Firm*—Becker & Becker, Inc.

[57] ABSTRACT

A sheet-like composite element for construction purposes. The longitudinal edges of the composite element are formed by U-shaped profiled edge members having legs that are directed toward one another and serve as supports for an inner and an outer cover layer, between which is disposed a core layer of hard foam. The edge members function as support elements, and have a cross-sectional area that conforms to the respective stress of the composite element. The hard foam core layer, which fills not only the space between the cover layers but also the hollow space of the profiled edge members, stabilizes the latter. Such a composite element permits free selection of the material and dimensions of the cover layers with a view toward the respective application of the composite element.

17 Claims, 10 Drawing Figures

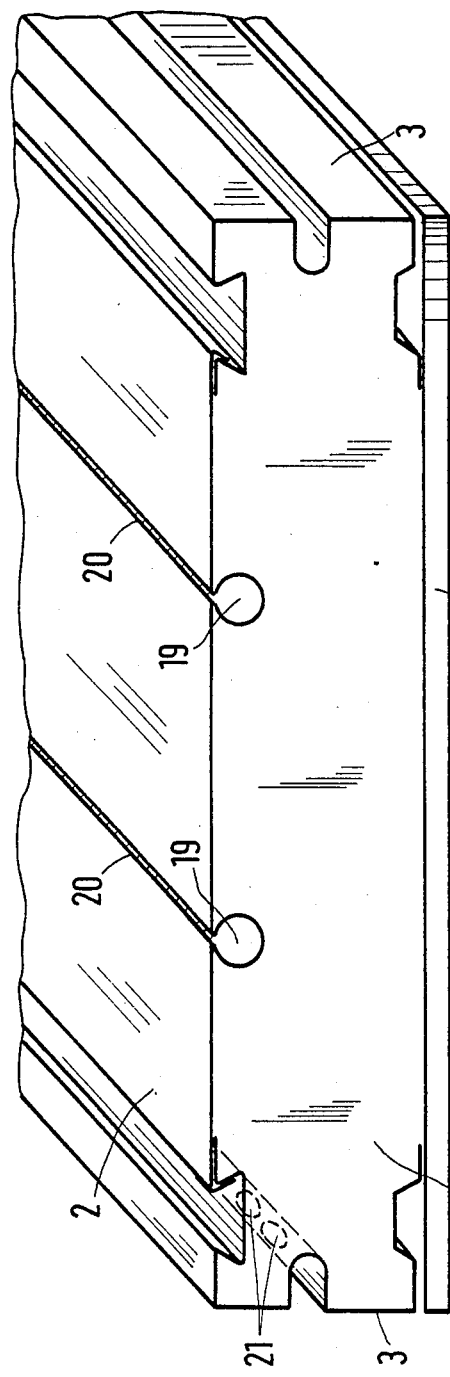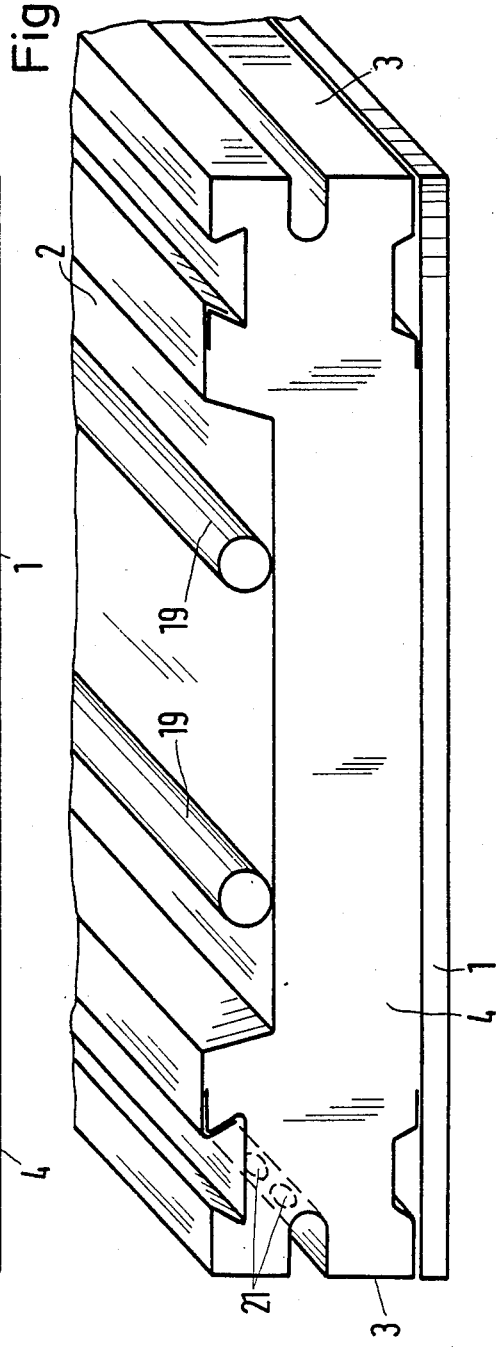

SHEET-LIKE COMPOSITE ELEMENT FOR CONSTRUCTION PURPOSES

BACKGROUND OF THE INVENTION

1. Field of the Invention

The present invention relates to a sheet-like composite element for construction purposes.

2. Description of the Prior Art

Various forms of such composite elements are known. They have metal or plastic cover layers that are interconnected by a core layer of hard foam in such a way that, while having a light weight, the sandwich effect results in an increased load bearing capacity which, due to the composite effect, is greater than the sum of the individual load carrying capacities of the cover layers and of the core layer.

The drawback of the heretofore known sandwich composite elements is that the material of the cover layers must essentially be selected from the point of view of the respective load carrying capacity that the composite element is to bear, so that the material of the cover layers can normally not be selected in conformity with the application of the composite element. For this reason, it is generally necessary to provide the heretofore known sheet-like composite elements with a covering or additional cover layers if the composite elements are to be used, for example, for the walls of the room, or as external elements that are exposed to weather.

An object of the present invention is to provide a sheet-like composite element of the aforementioned general type that has a given load bearing capacity independent of the material and of the design of the cover layers, so that the cover layers can be selected in conformity with the respective application of the composite element without regard to support characteristics.

BRIEF DESCRIPTION OF THE DRAWINGS

This object, and other objects and advantages of the present invention, will appear more clearly from the following specification in conjunction with the accompanying schematic drawings, in which:

FIG. 9 is a perspective view of the end face of a further inventive embodiment of a composite sheet having a cover layer shaped to form conduits; and FIG. 10 is a view similar to that of FIG. 9 showing an alternative embodiment for the provision of conduits.

SUMMARY OF THE INVENTION

Figure 1:
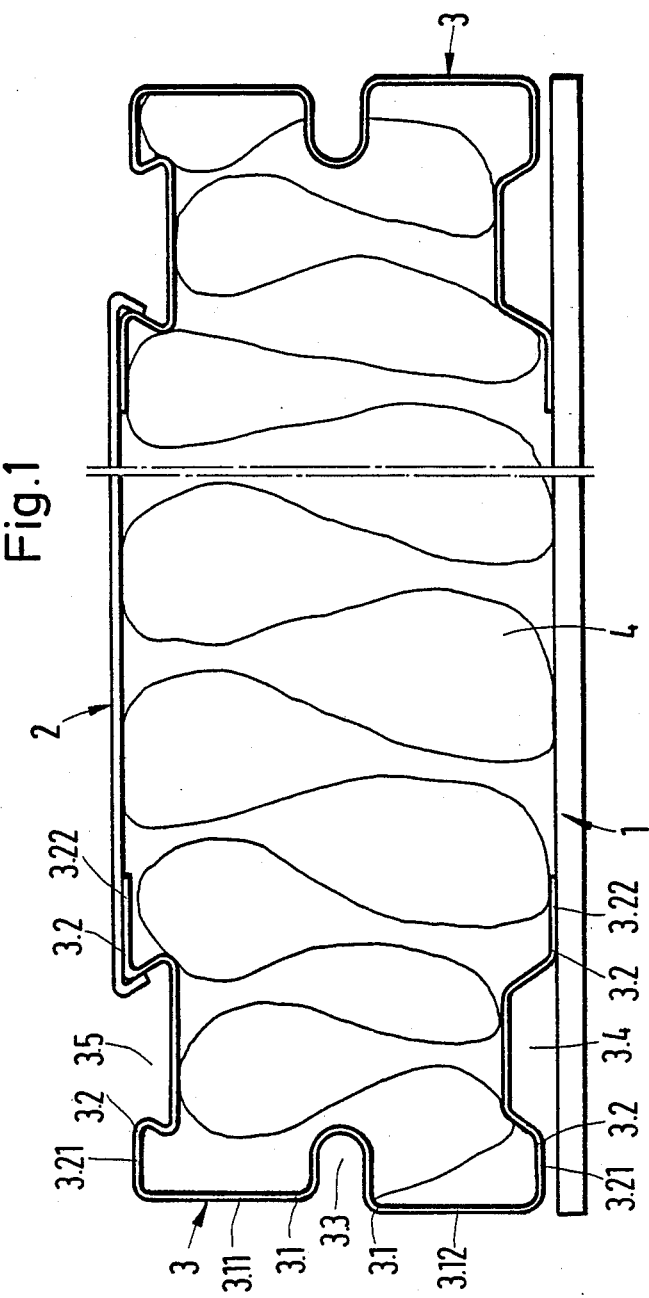
FIG. 1 is a cross-sectional view through a first inventive embodiment of a sheet-like composite element.

The sheet-like composite element of the present invention comprises: a first cover layer; a second cover layer; a core layer of hard foam disposed between the first and second cover layers; and profiled edge members disposed on the core layer, with each edge member having a U-shaped cross section with two legs and a cross-member connecting the legs; the first and second cover layers rest on one leg of each profiled edge member; the latter function as support elements and are disposed on opposite longitudinal edges of a given one of the composite elements in such a way that the legs of one edge member are directed toward the legs of another edge member; the cross-sectional area of the profiled edge members conforms to the respective stress of the composite element, with the core layer stabilizing the edge members.

The present invention provides a sheet-like composite element having a load bearing capacity that is not based on the sandwich effect of the cover layers that are interconnected by the hard foam core layer, but rather that is based on the tie-beam-construction of the composite element, with profiled edge members being disposed on the longitudinal edges of the element. These edge members function as support elements, thereby absorbing the primary load of the inventive composite element. The profiled edge members are disposed in the primary load direction of the composite element, and the cover layers that rest on the facing legs of the U-shaped profiled edge members serve only to connect the latter for forming a sheet-like component. In contrast to the known sandwich construction, the cover layers of the inventive composite element are not intended to absorb forces, although they must, of course, be in the position, based upon the inherent stability, to compensate for forces acting upon their surfaces due to external influences. However, these external influences are of little significance, so that with the inventive composite element, the shape and material of the outer and inner cover layers can conform completely to the respective application of the sheet-like composite element, because the support characteristic of the composite element is determined exclusively by the profiled edge members, which are embodied in conformity with the respective load that is to be encountered. The hard foam of the core layer also fills the cross-sectional area of the U-shaped profiled edge members, and assures that the geometric shape of these edge members, which function as support elements, will also be maintained under load conditions, since the stability of the shape of these U-shaped profiled edge members is decisive for the overall support characteristic of the composite element.

The present invention provides a sheet-like composite element for construction purposes that, in contrast to the heretofore known sandwich constructions, is provided as a tie-beam construction and has the advantage that the material and the design of the cover layers can conform to the respective application of the composite element without regard to the load bearing capacity, which is determined by the profiled edge members. As a result, the inventive composite element, without further measures having to be taken, can be utilized as the floor, roof, inner wall, or outer wall of a building; in other words, the composite element can be disposed vertically, horizontally, or at any desired angle. Since the inventive composite element can also be manufactured by a continuous fabrication in the longitudinal direction due to the fact that the profiled edge members are disposed only along the longitudinal edges, there results not only a versatile component, but also an economical one that has nearly unlimited applicability.

Although it is possible to use extruded or angled members as the profiled edge members, it is proposed pursuant to a further feature of the present invention, for the continuous manufacture of the inventive composite element, to produce the profiled edge members as roller-formed members, preferably of metal, so that the profiled edge members can be continuously produced from a coil. It is, of course, also possible to use profiled edge members made of a suitable plastic or composite synthetic material, as long as the required load bearing capacity of the composite element can be obtained with such a material. It is also possible, pursuant to the present invention, to interconnect adjacent profiled edge members of abutting composite elements with a profiled reinforcing member, so that an increase of the load bearing capacity can be achieved not only by an appropriate configuration of the profiled edge members, but also by the use of additional profiled reinforcing members. Pursuant to a preferred embodiment of the present invention, these reinforcing members can have a Z-shaped cross section, with the reinforcing members extending between the cross-members of adjacent profiled edge members and being disposed on opposite legs of the latter.

Pursuant to a further feature of the inventive composite element, the profiled edge members may be provided with at least one groove in the vicinity of each of the cross-members and the legs. These grooves serve not only to improve the stability, but can also be used to accommodate sealing members, to lay cables, for the insertion of profiled securing and covering members, as well as to accommodate securing elements with the aid of which the composite element is secured to a supporting structure.

Pursuant to a preferred embodiment of the present invention, that portion of each leg of a profiled edge member disposed between the groove and the cross-member is recessed slightly inwardly relative to the remaining portion of that leg, thus providing adjacent edge members of adjoining composite elements with a space for accommodating profiled reinforcing members, support elements, or cover strips in such a way that these elements do not project beyond the surface of the sheet-like composite elements. A portion of the cross-member of the profiled edge member, which cross-member is divided by the groove, can be recessed slightly inwardly relative to the other portion of the cross-member in order to provide an accommodating space between adjacent edge members. The inwardly recessed portions of the profiled edge members preferably extend parallel to the other parts of the edge members.

In order to be able to place the cover strips or support elements on adjacent profiled edge members of adjoining composite elements in a simple manner, it is proposed pursuant to a further feature of the present invention to embody at least one of the grooves in the legs of the edge members with a dovetailed cross section. Via the undercuts of such a dovetailed groove, it is possible to secure connecting elements to the edge members via a clamping force. Pursuant to a further feature of the present invention, one of the grooves in the legs of the profiled edge members can be provided with a trapezoidal cross section. A groove of this type makes it possible to accommodate, for example, cables or the heads of securing elements, such as bolts or rivets.

The groove in the cross-member of a given profiled edge member is preferably disposed in the middle of the cross-member, and can be provided with parallel sides and a semi-circular base, so that this groove is advantageously suited for the insertion of sealing elements. In order to prevent bridges of cold from forming, it is proposed pursuant to the present invention to provide the base of the groove of the cross-member with spaced-apart slotted holes that considerably reduce the conductivity of heat that takes place between the two legs of a given profiled edge member.

Since the load bearing capacity of the inventive composite element is essentially achieved by the profiled edge members, the cover layers, depending upon the intended application, can comprise wallboard, a sheet of fiber cement, a sheet of artificial stone, chip board, a sheet of synthetic material, a sheet of a metal such as steel, aluminum, or copper having a smooth or molded surface, and/or a sheet of paper or foil, including any combination of the above. In this way, it is possible to already adapt the inventive composite element to the respective application during manufacture, so that no additional measures will have to be undertaken after installation. Thus, for example, when the composite element is to be used as an outer wall or roof member, it is possible to form the outer layer of a sheet of aluminum, which at the same time forms the outer covering, whereas the inner cover layer can comprise wallboard that can be readily painted or provided with wall paper. To the extent that no internal completion is required when the composite element is used as a roof member, the inner cover layer can also be formed from a sheet of paper or foil, since the inner cover layer serves only to prevent the escape of hard foam during the manufacture of the composite element. A composite element used as a floor member is preferably manufactured with a cover layer of chip board on which can be directly placed any floor covering, such as carpet.

Pursuant to a further feature of the present invention, it is also possible to produce the outer or inner cover layer integrally with the plastic or metal profiled edge members, so that there results a composite element comprising the two profiled edge members with one of the cover layers formed thereon, a cover layer placed upon the free edges of the edge members, and the hard foam core that reinforces the profiled edge members and fills the space between the cover layers.

It is finally proposed pursuant to the present invention to dispose in or on the outer cover layer a plurality of parallel extending conduits for water that is conveyed in a closed circuit and is heated up by solar energy. In this way, the inventive composite element can also be used in a simple manner for the construction of a so-called energy roof that is used for heating up water or for operating a heat pump. The conduits can either be individual components secured to the outer cover layer, or can be produced integrally with the outer cover layer. Pursuant to the present invention, this integral construction can be obtained if the outer cover layer, in the longitudinal direction, is provided with hollow spaces produced by bending or rolling the cover layer. These hollow spaces are made into conduits by continuous welding or soldering seams.

DESCRIPTION OF PREFERRED EMBODIMENTS

The sheet-like composite element illustrated in cross-section in FIG. 1 includes an inner cover layer 1 and an outer cover layer 2. The edges of the cover layers 1, 2 rest upon the legs of U-shaped profiled edge members 3. The hollow space of the edge members 3, as well as the space formed between the cover layers 1 and 2, are filled by a core layer 4 of hard foam. By way of example, a preferred hard foam could be a synthetic resin foam such as polyurethane.

As previously mentioned, the profiled edge members 3 have a U-shaped cross section that has a cross-member 3.1 and two legs 3.2. The legs 3.2 of the edge members 3 of a given composite element are directed toward one another. In the embodiment illustrated in FIG. 1, a groove 3.3 is provided in the cross-member 3.1, a groove 3.4 is provided in one of the legs 3.2, and a groove 3.5 is provided in the other leg 3.2. The groove 3.3 in the cross-member 3.1 is provided with sides that extend parallel to one another and a semi-circular base. The groove 3.4 in that leg 3.2 that supports the inner cover layer 1 has a trapezoidal cross section. The groove 3.5 provided in that leg 3.2 that supports the outer cover layer 2 has a dovetailed cross section.

As can be seen in FIG. 1, the parts 3.21 of tne legs 3.2 disposed between the grooves 3.4 or 3.5 and the cross-member 3.1 are recessed inwardly relative to the other part 3.22 of the legs 3.2, with the parts 3.21 and 3.22 extending parallel to one another. The cross-member 3.21, which in the illustrated embodiment is divided approximately in half by the groove 3.3, is also provided with a part 3.11 that is recessed slightly inwardly relative to the other part 3.12 of the cross-member 3.1. This recessed arrangement provides space for accommodating securing or reinforcing elements, as will be described in detail subsequently.

The U-shaped profiled edge members 3 are oriented in the direction of the primary stress of the sheet-like composite element. These edge members 3 act as carriers or support members, and essentially absorb the stress of the composite element, so that the latter does not function in the manner of a sandwich-construction, but rather functions in the manner of a tie beam construction, especially when the composite element is connected with further elements. Since pursuant to the present invention, the cover layers 1 and 2 are not intended for absorbing forces, these cover layers can in each case be made of materials that are selected in conformity with the respective application of the composite element. In the embodiment of FIG. 1, for example, the inner cover layer 1 comprises a sheet of wallboard, and the outer cover layer 2 comprises a sheet of aluminum. The sheet of wallboard that forms the inner cover layer 1 can be glued to the part 3.22 of one of the legs 3.2 of the profiled edge member 3, or can be glued to the core layer 4 to thus hold the cover layer 1 without having to glue it directly to the edge member 3. The edges of the aluminum sheet that forms the outer cover layer 2 rest upon the parts 3.22 of the other leg 3.2 of the edge member 3 and are bent, so that they extend into or engage the dovetailed groove 3.5, whereby the cover layer 2 is secured to the profiled edge members 3 via this clamping. The exemplary embodiment of the composite element illustrated in FIG. 1 can, for example, be used as an outer wall, since the outer cover layer 2 that is clamped via the profiled edge members 3 can be exposed to the weather; adjoining composite elements are sealed off relative to one another by placing profiled sealing members in the grooves 3.3. The inner cover layer 1 formed by the sheet of wallboard can be painted or covered with wall paper, so that it is not necessary to apply plaster or to otherwise treat the composite element. The trapezoidal groove 3.4 can, for example, be used for laying electrical or telephone lines.

Figure 2:
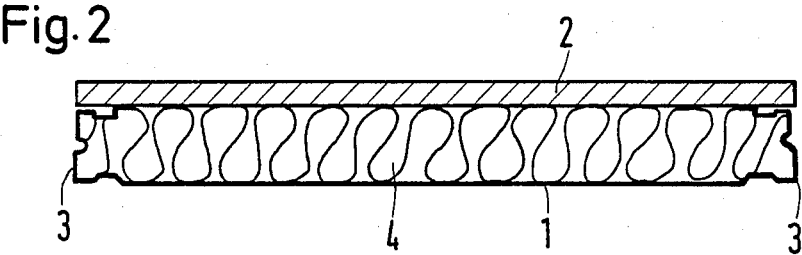
FIG. 2 is a cross-sectional view through an inventive embodiment of a composite element used as a floor element.
Figure 3:
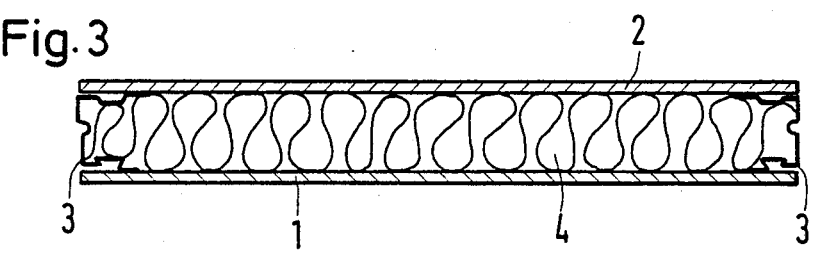
FIG. 3 is a cross-sectional view through an inventive embodiment of a composite element used as an outer wall section.
Figure 4:
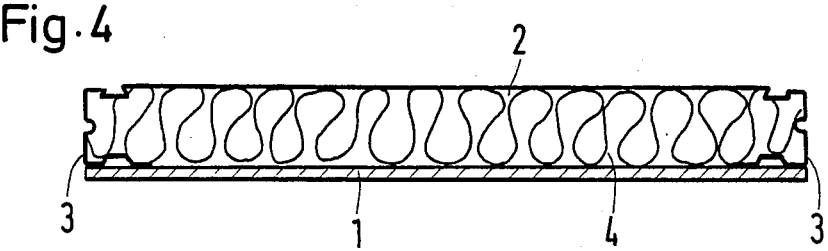
FIG. 4 is a cross-sectional view through an inventive embodiment of a composite element used as a roof element.
Figure 5:
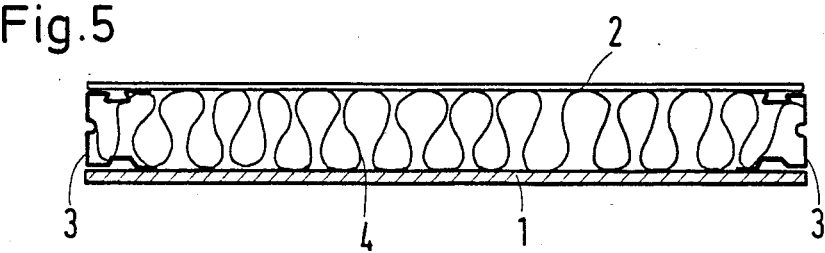
FIG. 5 is a cross-sectional view through an inventive embodiment of a composite element used as an inner wall section.

The composite elements illustrated in FIGS. 2 to 5 are made using the profiled edge members 3 of FIG. 1 and show further design possibilities. For example, FIG. 2 shows a floor element, the outer cover layer 2 of which is formed by a sheet of chip board, with the inner cover layer 1 being made unitarily with the two profiled edge members 3, and comprising aluminum. FIG. 3 is a schematic crosssectional view through an outer wall portion, with the inner cover layer 1 and the outer cover layer 2 each comprising a sheet of fiber cement. The composite element illustrated in FIG. 4 is embodied as a roof member, with the outer cover layer 2 being manufactured unitarily with the profiled edge members 3, for example from sheets of galvanized steel; the inner cover layer 1 comprises a sheet of wallboard. However, in place of the wallboard, it would also be possible to use molded fiber board, sheets of plastic or paper, or foil. Especially when no completion of the inside of the roof is to be effected, it is sufficient to use a sheet of paper or foil for forming the inner cover layer 1 of the composite element and for preventing the escape of the hard foam that forms the core layer 4, because the cover layers 1 and 2 do not have to absorb any forces. The embodiment in FIG. 5 shows a composite element that is to be used as an inner wall member. With this embodiment, the inner cover layer 1 comprises wallboard whereas the outer cover layer 2 comprises fiber board.

Figure 6:
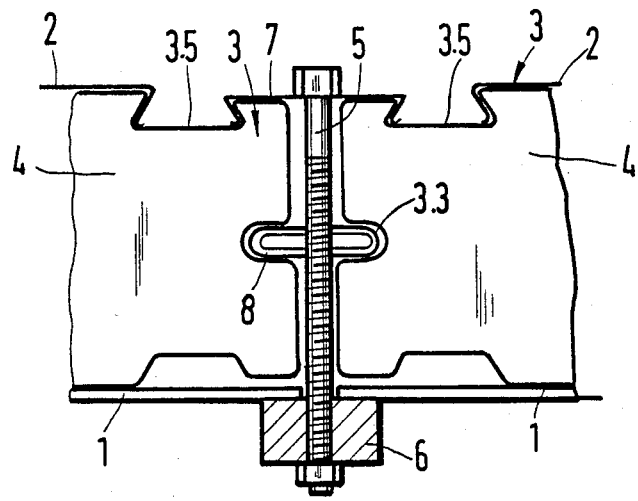
FIG. 6 is a cross-sectional view through the profiled edge members of two adjoining composite elements, and shows a first embodiment for securing the composite elements to a support element.
Figure 7:
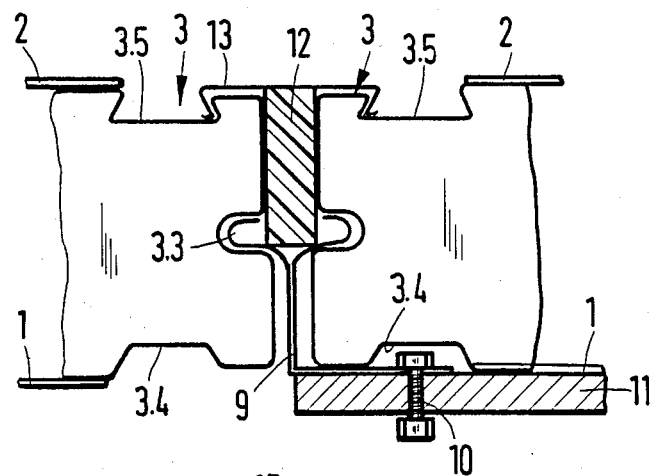
FIG. 7 is a cross-sectional view similar to that of FIG. 6 showing an alternative embodiment for securing the composite elements to a supporting sturcture.
Figure 8:
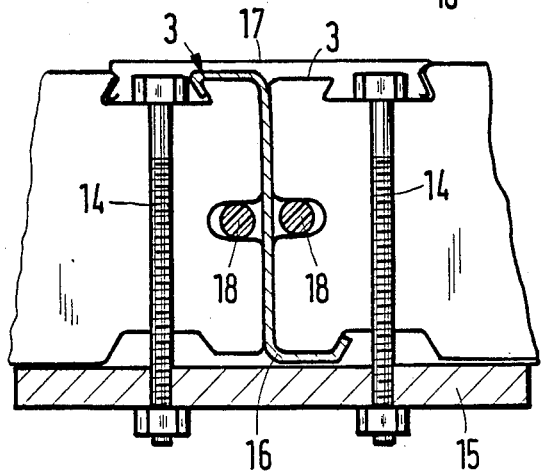
FIG. 8 is a cross-sectional view similar to that of FIG. 6, and shows a further embodiment for securing the composite elements to a base structure while at the same time using a profiled reinforcing member.

FIGS. 6 to 8 show three different possibilities for securing the composite elements on various supporting structures. In the embodiment shown in FIG. 6, the composite elements are secured to a support element 6 via a bolt 5, with the inner cover layers 1 of adjacent composite elements resting upon the support element 6. The bolt 5 extends through the support elements 6, with the head of the bolt 5 resting upon a support strip 7, the bent edges of which extend into or engage the dovetailed grooves 3.5 of the adjacent profiled edge members 3. Also shown is a profiled sealing member 8 that is placed in the grooves 3.3 of the profiled edge members 3. Spaced-apart bolts 5 pass through the profiled sealing member 8, which is embodied as a hollow member on which are formed sealing strips.

In the embodiment shown in FIG. 7, adjacent composite elements are secured with the aid of a support bracket 9, the forked end of which extends into the groove 3.3 of the profiled edge members 3. The other end of the support bracket 9 is secured to a supporting structure 11 by means of a bolt 10. The upper head of the bolt 10 is disposed in the trapezoidal groove 3.4 of one of the two profiled edge members 3, so that the entire surface of the inner cover layer 1, which may be formed, for example, from a sheet of paper or from foil, rests upon the supporting structure 11. Beyond the support bracket 9, a sealing strip 12 is disposed between the cross-members 3.1 of adjacent profiled edge members3. This sealing strip 12 is held by a cover strip 13, which is clamped into the dovetailed grooves 3.5 of the profiled edge members 3 with the aid of bent edges.

The construction illustrated in FIG. 8 shows that the composite elements can also be secured to a support or base structure 15 by bolts 14 that extend through each profiled edge member 3 in the vicinity of the grooves 3.4 and 3.5 thereof. In the embodiment of FIG. 8, the load-bearing capacity of the composite elements is increased via a profiled reinforcing member 16 that is disposed between abutting edge members 3 of adjacent composite elements. In the illustrated embodiment, the reinforcing member 16 has a Z-shaped cross section, so that a portion of the reinforcing member 16 rests upon the outer leg 3.2 of one of the profiled edge members 3, and another portion of the member 16 rests upon the inner leg 3.2 of the other edge member 3. The reinforcing member 16 extends over the entire length of the composite elements, with the material and dimensions thereof appropriately conforming to the respective load that is to be absorbed. In the embodiment of FIG. 8, the butt joint between adjacent profiled edge members 3 is covered by a connecting strip 17 that is placed in the dovetailed grooves 3.5. Tube-like sealing members 18 are disposed in the grooves 3.3 of the profiled edge members 3 on both sides of the profiled reinforcing member 16.

Finally, FIGS. 9 and 10 show embodiments where the composite element is provided with conduits 19 for water that is circulated in a closed cycle. In the embodiment of FIG. 10, the conduits 19 are separate components disposed on the inwardly recessed cover layer 2 of the composite element, while in the embodiment of FIG. 9, the conduits 19 are formed by an appropriate profiling of the cover layer 2. In this case, the cover layer 2 is provided with rolled-in spaces having a circular cross-section. The spaces are closed off by continuous welding or soldering seams 20, resulting in each case in a continuous conduit 19. Especially when the cover layer 2 is formed from a sheet of copper, there results a good effectiveness of the composite element that is embodied as a so-called solar or energy roof. The ends of the conduits 19, that are disposed or formed on the outer cover layer 2, are connected to a circuit that conveys the water that is heated up by the solar energy to a warm-water user, an intermediate storage tank, or a heat pump.

In order to prevent the formation of bridges of cold between the legs 3.2 of the profiled edge members 3, the cross-members 3.1 in the embodiments of FIGS. 9 and 10 are provided with slotted holes 21. In this way, the conduction of heat within the structural element via the profiled edge members 3 is considerably reduced. It is to be understood that the other embodiments could also be provided with such slotted holes 21.

The present invention is, of course, in no way restricted to the specific disclosure of the specification and drawings, but also encompasses any modifications within the scope of the appended claims.

What I claim is:

1. A sheet-like composite element for construction purposes, said element having opposite longitudinal edges and comprising:
   a first cover layer that spans a distance between opposite longitudinal edges respectively;
   a second cover layer that also spans a distance between opposite longitudinal edges respectively so that a space is bounded by said opposite longitudinal edges as well as said first and second cover layers;
   a core layer of hard foam disposed between said first and second cover layers to fill the space therebetween; and
   profiled edge members disposed on said core layer along the opposite longitudinal edges, with each of said profiled edge members having a U-shaped cross section with two legs and a cross-member that connects said legs respectively; each of said cover layers having contact on one of said legs of each of said edge members, with said edge members particularly functioning as predetermined support elements independently of material embodiment of said cover layers and being disposed on said opposite longitudinal edges of a given one of said composite elements such that said legs of one of said profiled edge members are directed toward said legs of another one of said edge members; said edge members having a cross-sectional area that conforms to the respective stress and loading to be encountered by said composite element, with said core layer exclusively providing only stabilization for said edge members, said cross-member and said legs of each of said edge members each being provided with at least one groove.

2. A composite element according to claim 1, in which said profiled edge members are roller-formed members.

3. A composite element according to claim 1, which includes a profiled reinforcing member for interconnecting adjacent edge members of abutting composite elements.

4. A composite element according to claim 3, in which said reinforcing member has a Z-shaped cross-sectional shape.

5. A composite element according to claim 1, in which each of said legs of said edge members has a groove that divides its leg into a first part, which is disposed between said groove and said cross-member, and into a second part, which is remote from said cross-member; said first part of each of said legs is recessed slightly inwardly relative to said second part thereof.

6. A composite element according to claim 5, in which said cross-member of said edge members has a groove that divides said cross-member into two parts, one of which is recessed slightly inwardly relative to the other.

7. A composite element according to claim 6, in which said recessed first part and said second part of said legs extend parallel to one another, and said two parts of said cross-member extend parallel to one another.

8. A composite element according to claim 1, in which at least one of said grooves in said legs of said edge members has a dovetailed cross-sectional shape.

9. A composite element according to claim 1, in which at least one of said grooves in said legs of said edge members has a trapezoidal cross-sectional shape.

10. A composite element according to claim 1, in which said cross-member of said edge members has a centrally disposed groove that has parallel sides and a semicircular base.

11. A composite element according to claim 10, in which said base of said groove in said cross-member is provided with spaced-apart slotted holes.

12. A composite element according to claim 1, in which said cover layers are made of at least one material selected from the group consisting of wallboard, fiber cement, artificial stone, chipboard, plastic, smooth metal, molded metal, paper, foil, and combinations thereof.

13. A composite element according to claim 1, in which one of said cover layers is integral with said profiled edge members.

14. A composite element according to claim 13, in which said edge members are made of a material selected from the group consisting of metal and synthetic material.

15. A composite element according to claim 1, in which several conduits that extend parallel to one another are disposed in or on one of said cover layers for conveying water that is to be heated by solar energy.

16. A composite element according to claim 15, in which said conduits are separate components disposed on one of said cover layers.

17. A composite element according to claim 15, in which said conduits are formed in one of said cover layers by forming in the latter hollow cylindrical spaces that are closed off by a continuous welding or soldering seam.

* * * * *